United States Patent
Kuji

(10) Patent No.: US 9,657,457 B2
(45) Date of Patent: May 23, 2017

(54) SHOVEL

(75) Inventor: Izumi Kuji, Yokosuka (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 771 days.

(21) Appl. No.: 13/981,183

(22) PCT Filed: Jan. 16, 2012

(86) PCT No.: PCT/JP2012/050689
§ 371 (c)(1),
(2), (4) Date: Jul. 23, 2013

(87) PCT Pub. No.: WO2012/102108
PCT Pub. Date: Aug. 2, 2012

(65) Prior Publication Data
US 2013/0302127 A1    Nov. 14, 2013

(30) Foreign Application Priority Data
Jan. 26, 2011 (JP) .................. 2011-014214

(51) Int. Cl.
*H01G 11/12* (2013.01)
*E02F 9/08* (2006.01)
(Continued)

(52) U.S. Cl.
CPC .......... *E02F 9/0866* (2013.01); *E02F 9/0808* (2013.01); *E02F 9/0858* (2013.01);
(Continued)

(58) Field of Classification Search
CPC ... B60K 6/28; H01G 2/04; H01G 2/08; H01G 9/016; H01G 9/14; H01G 11/12;
(Continued)

(56) References Cited

U.S. PATENT DOCUMENTS 9,299,500 B2 *  3/2016 Watanabe .............. H01G 9/155
2005/0089751 A1 *  4/2005 Oogami .............. H01M 2/1061
                                                           429/162

(Continued)

FOREIGN PATENT DOCUMENTS

EP          2450826 A       1/2009
EP          2375427 A1     10/2011
(Continued)

OTHER PUBLICATIONS

International Search Report dated Apr. 17, 2012 corresponding to International Patent Application No. PCT/JP2012/050689.

(Continued)

*Primary Examiner* — Michael McCullough
*Assistant Examiner* — Brendan Tighe
(74) *Attorney, Agent, or Firm* — Squire Patton Boggs (US) LLP

(57) ABSTRACT

An electric motor receives electric power from an electricity storage module. A drive target is driven by the electric motor. The electricity storage module has a plurality of protection plates, which are stacked up in a stacked direction, and a plate-shaped electricity storage cell, which is interposed between the protection plates adjacent to each other. The protection plates have a positional restriction shape for restricting a relative position with respect to a positional restriction direction which is perpendicular to the stacked direction.

1 Claim, 17 Drawing Sheets

(51) Int. Cl.
| | |
|---|---|
| E02F 9/20 | (2006.01) |
| H01G 11/10 | (2013.01) |
| H01G 11/78 | (2013.01) |
| H01G 11/82 | (2013.01) |
| H01M 2/10 | (2006.01) |
| H01M 10/04 | (2006.01) |
| E02F 9/12 | (2006.01) |
| E02F 9/22 | (2006.01) |
| H01M 10/625 | (2014.01) |
| H01M 10/647 | (2014.01) |
| H01M 10/6556 | (2014.01) |
| H01M 10/6557 | (2014.01) |
| H01M 10/6555 | (2014.01) |
| H01M 10/6554 | (2014.01) |
| H01M 10/613 | (2014.01) |

(52) U.S. Cl.
CPC ............ *E02F 9/123* (2013.01); *E02F 9/2091* (2013.01); *E02F 9/2095* (2013.01); *E02F 9/22* (2013.01); *H01G 11/10* (2013.01); *H01G 11/78* (2013.01); *H01G 11/82* (2013.01); *H01M 2/1077* (2013.01); *H01M 10/0481* (2013.01); *H01M 10/613* (2015.04); *H01M 10/625* (2015.04); *H01M 10/647* (2015.04); *H01M 10/6554* (2015.04); *H01M 10/6555* (2015.04); *H01M 10/6556* (2015.04); *H01M 10/6557* (2015.04); *Y02E 60/13* (2013.01)

(58) Field of Classification Search
CPC ........ H01G 11/52; H01G 11/72; H01G 11/78; H01G 11/82; H01M 2/0237; H01M 2/024; H01M 2/0245; Y02E 60/13; Y02T 10/7022
USPC ........................... 361/274.2, 274.3, 502, 541
See application file for complete search history.

(56) References Cited

U.S. PATENT DOCUMENTS

| | | | |
|---|---|---|---|
| 2010/0060243 | A1 | 3/2010 | Niigaki et al. |
| 2011/0242732 | A1 | 10/2011 | Kobayashi et al. |
| 2012/0234613 | A1* | 9/2012 | Miyatake ............... E02F 9/0858 180/65.1 |
| 2013/0209850 | A1* | 8/2013 | Yokoyama ............. H01G 11/12 429/99 |
| 2014/0333239 | A1* | 11/2014 | Yokoyama ............. H01M 2/20 318/139 |
| 2014/0377634 | A1* | 12/2014 | Nakajyo ................ H01G 11/76 429/158 |

FOREIGN PATENT DOCUMENTS

| | | |
|---|---|---|
| JP | 3-57925 U | 6/1991 |
| JP | 2000-348781 A | 12/2000 |
| JP | 2001-011888 A | 1/2001 |
| JP | 2005-268004 A | 9/2005 |
| JP | 2008-053072 A | 3/2008 |
| JP | 2010-045220 A | 2/2010 |
| JP | 2010-153733 A | 7/2010 |
| JP | 2010-242434 A | 10/2010 |
| JP | 5173167 B2 | 3/2013 |
| WO | WO 9101041 A1 * | 1/1991 ............... H01G 2/04 |
| WO | WO 2007/126082 A1 | 11/2007 |
| WO | WO 2010/074009 A1 | 7/2010 |

OTHER PUBLICATIONS

International Preliminary Report on Patentability dated Feb. 18, 2013 corresponding to International Patent Application No. PCT/JP2012/050689 and partial English translation thereof.
Japanese Office Action Notice of Reasons of Rejection application No. 2012-554727 mailed Mar. 17, 2015.
Japanese Office Action Notice of Reasons of Rejection application No. 2012-554727 mailed Nov. 10, 2015.

* cited by examiner

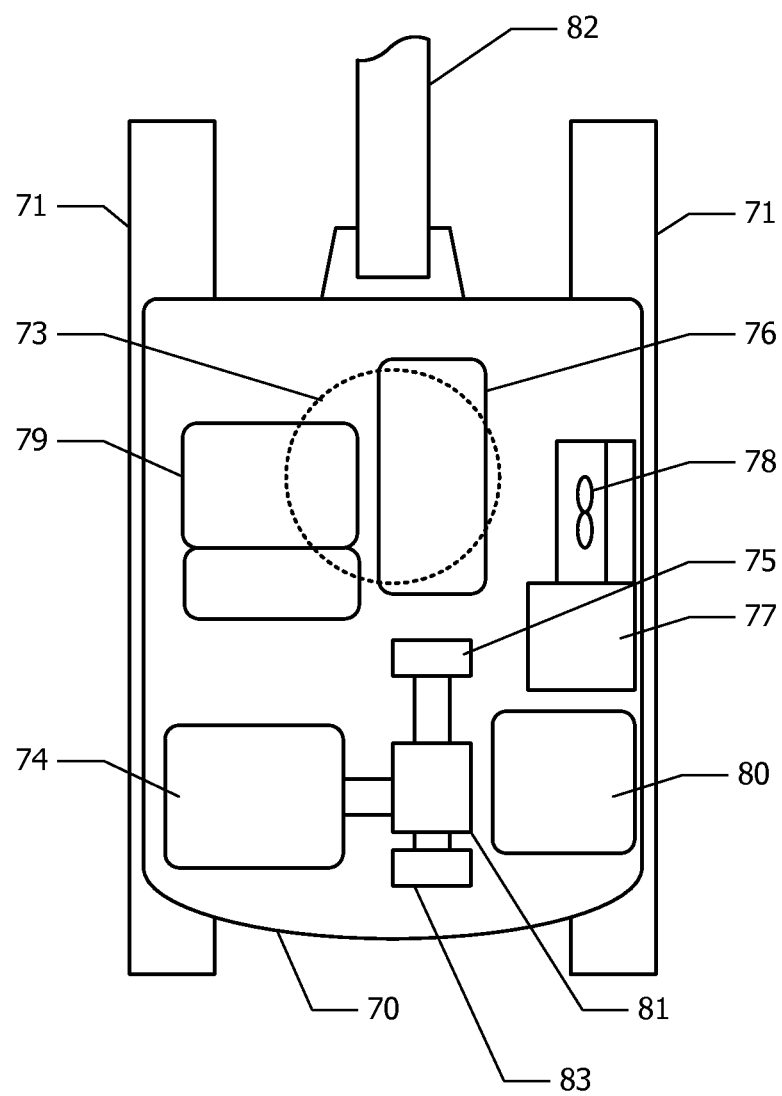

SHOVEL

TECHNICAL FIELD

The present invention relates to a shovel mounted with an electricity storage module.

BACKGROUND ART

An electricity storage cell in which an electricity storage laminated body formed by laminating a cathode, an anode and a separator is accommodated in an electricity storage case constituted by a block-shaped outer shell and a laminate film has been known (PTL 1). It is possible to perform an operation at a desired voltage by connecting the electricity storage cells in series in the manner of stacking the electricity storage cases. Since the shape of the electricity storage cell is defined by the blocked-shaped outer shell, it is possible to easily stack the electricity storage cases.

An electric double layer capacitor (an electricity storage cell) in which an electricity storage laminated body is interposed between laminate films and the laminate films are fusion-bonded has been known (PTL 2). In the case of the method in which the laminated films are fusion-bonded, and thus a block-shaped outer shell is unnecessary, it is possible to efficiently and simply assemble the electricity storage cell.

PRIOR ART DOCUMENT

Patent Literature

[PTL 1] Japanese Unexamined Patent Application Publication No. 2010-153733
[PTL 2] Japanese Unexamined Patent Application Publication No. 2010-45220

SUMMARY OF INVENTION

Problem to be Solved by Invention

In the structure in which laminated films are fusion-bonded, material having a high rigidity for defining an outer shape of an electricity storage cell is not used. Therefore, it is difficult to position the electricity storage cells when stacking the electricity storage cells. In addition, if a foreign substance adheres to a surface of the laminated film when the electricity storage cell is stored, there is a case in which the laminated film is damaged by the foreign substance when a compressive force is applied to the stacked electricity storage cells.

Compared to an automobile, a working machine frequently travels on a gravel road with a poor road surface. In addition, when the working machine works, there is a high possibility of collision with deposited materials or structures surrounding the working machine, as well. Thus, a large vibration or impact is applied to an electricity storage module mounted in the working machine. The risk of damage caused by the vibration or impact is high with respect to the electricity storage cell.

An object of the present invention is to provide a shovel mounted with an electricity storage module which enables easier positioning of electricity storage cells when stacking the electricity storage cells.

Means of Solving Problems

According to one aspect of the present invention, there is provided a shovel including: a base carrier; an upper revolving body which is revolvably mounted on the base carrier; an electricity storage module; an electric motor which revolves the upper revolving body by receiving power supplies from the electricity storage module; and a driving target driven by the electric motor, in which the electricity storage module has a plurality of protection plates which are stacked up on each other in a laminating direction and a plate-shaped electricity storage cell which are interposed between the protection plates adjacent to each other, and the protection plates have a positional regulation shape for regulating a relative position with respect to a positional regulation direction which is perpendicular to the laminating direction.

Advantageous Effects of Invention

Since relative positions of protection plates are restricted with respect to a positional restriction direction, it is easy to carryout a stacking work of the protection plates. In addition, since the relative position of the protection plates is less likely to be changed, deviation thereof is hardly caused by vibration or impact. It is possible to suppress damage of an electricity storage cell by storing the electricity storage cell in a state of being interposed between the protection plates.

BRIEF DESCRIPTION OF DRAWINGS

FIG. 11 is a schematic plan view of a hybrid shovel according to an example 4.

DESCRIPTION OF EMBODIMENTS

Electricity storage modules according to examples 1 to 3 and working machines according to examples 4 and 5 will be described with reference to drawings.

EXAMPLE 1

Figure 1:
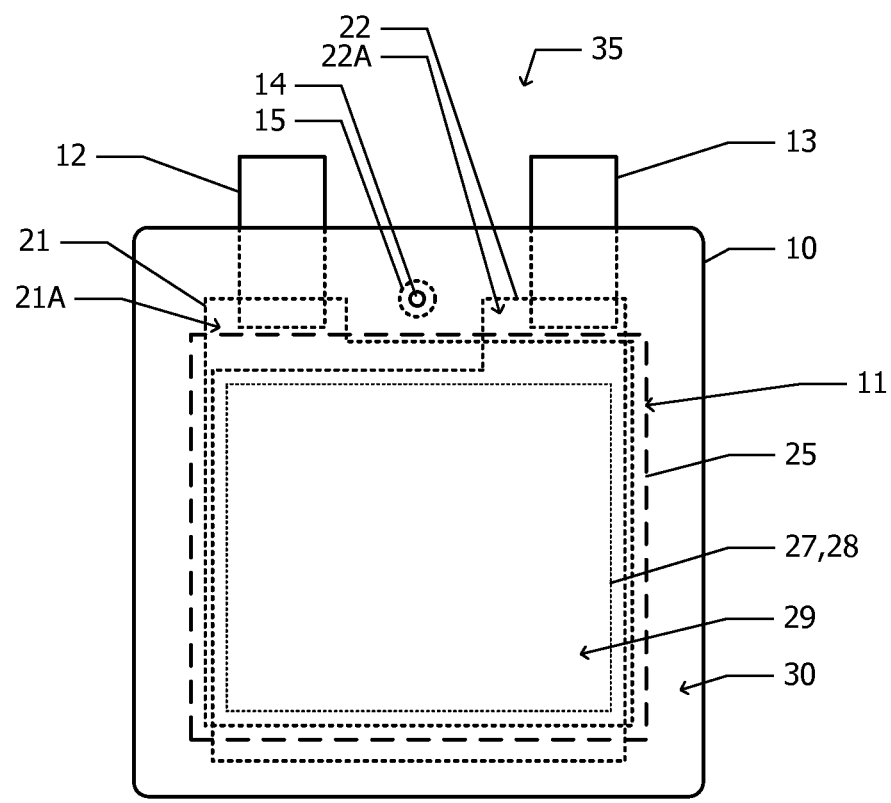
FIG. 1 is a plan view of an electricity storage cell used to an electricity storage module according to an example 1.

FIG. 1 shows a plan view of an electricity storage cell 35 adopted to an electricity storage module according to an example 1. An electricity storage laminated body 11 is accommodated in an electricity storage container 10. A planar shape of the electricity storage container 10 is a rectangular shape of which apexes are slightly rounded, for example. The electricity storage laminated body 11 includes first collecting electrodes 21, second collecting electrodes 22, separators (electrolyte layers) 25, first polarizable electrodes 27 and second polarizable electrodes 28. The first collecting electrodes 21 and the second collecting electrodes 22 are superimposed on each other over the most part thereof. The first polarizable electrodes 27 and the second polarizable electrodes 28 are disposed in a part where both collecting electrodes 21 and 22 are superimposed on each other.

The first polarizable electrodes 27 and the second polarizable electrodes 28 are disposed in a substantially same region in plan view. In this case, the region in which the first polarizable electrodes 27 and the second polarizable electrodes 28 are disposed is designated as an "electrode area" 29. In addition, an area located further outside than the electrode area 29 and further inside than an outer circumference of the electricity storage container 10 is designated as a "frame area" 30. The frame area 30 is thinner than the electrode area 29.

The first collecting electrodes 21 and the second collecting electrodes 22 respectively have extension parts 21A and 22A which respectively extend from different positions on an edge of the electrode area 29 in a same direction (an upward direction in FIG. 1). An outer circumferential line of the separator 25 is positioned further outside than the area in which the first collecting electrodes 21 and the second collecting electrodes 22 are superimposed on each other. The extension parts 21A and 22A are led further outside than an outer circumference of the separator 25.

A first collecting electrode tab 12 and a second collecting electrode tab 13 are respectively drawn out from an inner side of the electricity storage container 10 to an outer side of the electricity storage container 10, in a state of intersecting the same edge of the electricity storage container 10. The first collecting electrode tab 12 and the second collecting electrode tab 13 are respectively superimposed on the extension parts 21A of the first collecting electrodes 21 and the extension parts 22A of the second collecting electrodes 22, thereby being electrically connected to the first collecting electrodes 21 and the second collecting electrodes 22. The first collecting electrode tab 12 and the second collecting electrode tab 13 function as electrodes of which polarity is reversed.

A gas drainage hole 14 is formed in a frame area 30 of the electricity storage container 10. The gas drainage hole 14 is disposed between the extension part 21A and the extension part 22A, for example. A gas drainage structure 15 is disposed at a position in which the gas drainage hole 14 is superimposed thereon. Gas generated in the electricity storage container 10 is drained to the outside through the gas drainage structure 15 and the gas drainage hole 14. The gas drainage structure 15 prevents moisture or the like from invading from the outside to an inner side of the electricity storage container 10.

Figure 2:
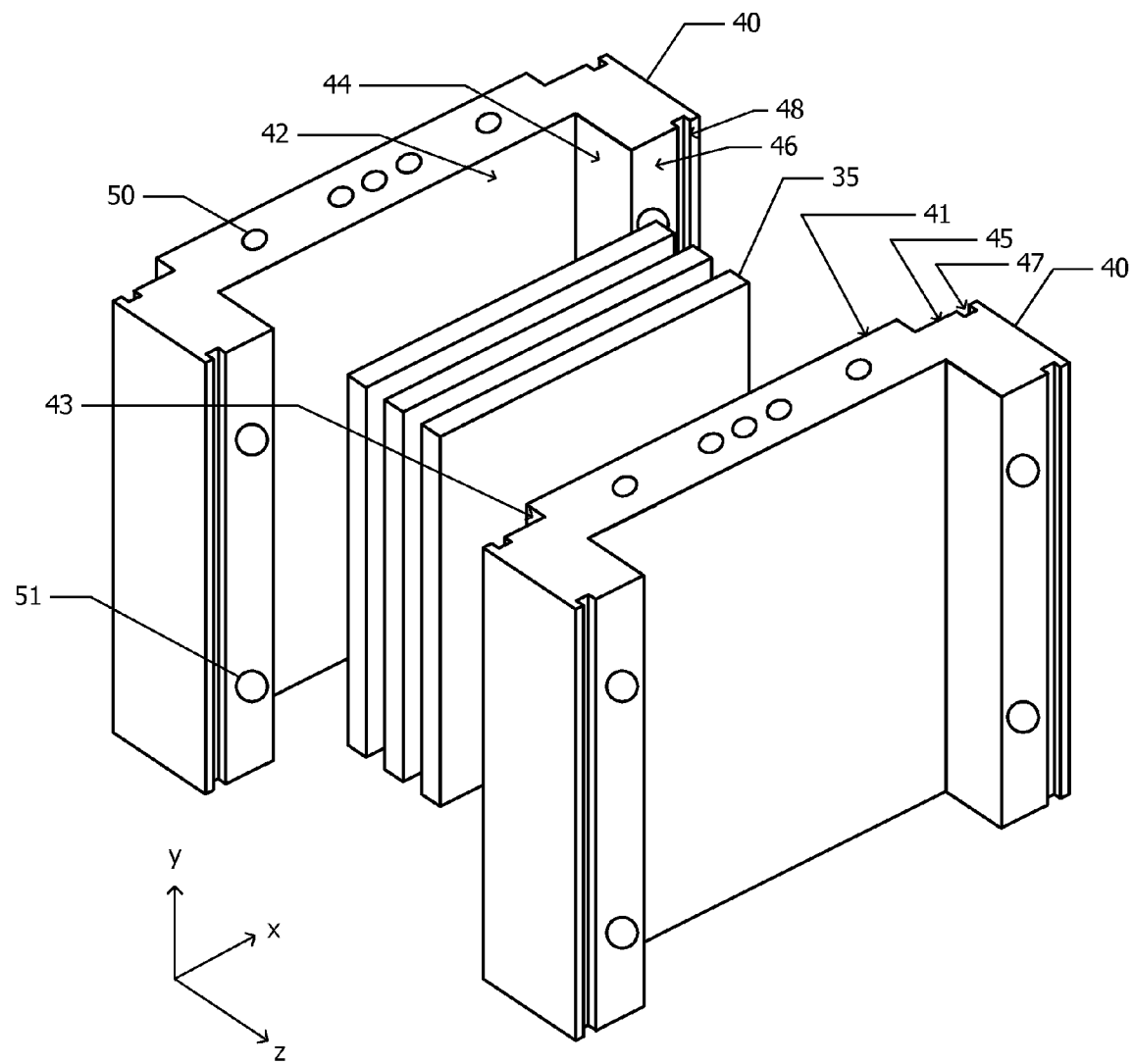
FIG. 2 is an exploded perspective view of a part of the electricity storage module according to the example 1.

FIG. 2 shows an exploded perspective view of a part of the electricity storage module according to the example 1. A plurality (three, for example) of electricity storage cells 35 which are stacked in a thickness direction are interposed between two protection plates 40. An xyz orthogonal coordinate system, in which a stacking direction (a thickness direction) of the electricity storage cells 35 is set as a z-axis direction, is defined. A plurality of protection plates 40 have the same geometrical shape. A first main surface 41 on one protection plate 40 and a second main surface 42 on the other protection plate 40 face each other, and the electricity storage cells 35 are interposed therebetween. The first main surface 41 and the second main surface 42 hold a posture perpendicular to the z-axis and respectively have a pair of edges parallel to an x-axis and a pair of edges parallel to a y-axis.

First stepped surfaces (falling surfaces) 43 are respectively continued to the pair of edges parallel to the y-axis of the first main surface 41. Furthermore, first sub-surfaces (a lower surface) 45 are continued to the first stepped surfaces 43. The first sub-surfaces 45 are provided at a position lower than the first main surface 41. The first stepped surfaces 43 are perpendicular to the x-axis, and the first sub-surfaces 45 are perpendicular to the z-axis.

Second stepped surfaces (rising surfaces) 44 are respectively continued to the pair of edges parallel to the y-axis of the second main surface 42. Furthermore, second sub-surfaces (higher surfaces) 46 are continued to the second stepped surfaces 44. The second sub-surfaces 46 are provided at a position higher than the second main surface 42. The second stepped surfaces 44 are perpendicular to the x-axis, and the second sub-surfaces 46 are perpendicular to the z-axis.

An x-axial dimension (a width) of the first main surface 41 is slightly smaller than that of the second main surface 42. A height of the rising surface 44 (a z-axial dimension) is greater than the sum of the total thickness of the plurality of electricity storage cells 35, which are interposed between the protection plates 40, and a height (a z-axial dimension) of the falling surface 43. Therefore, when a compressive force is applied to the protection plates 40 and the electricity storage cells 35, in a stacking direction (the z-axis direction), the first main surface 41 of one protection plate 40 is inserted into a position deeper than that of the higher surface 46 of the other protection plate 40. Thereby, the rising surface 44 of one protection plate 40 partially faces the falling surface 43 of the other protection plate 40.

When the first main surface 41 and the second main surface 42 are set to have a very small difference in width, the falling surface 43 and the rising surface 44 which face each other are in contact with each other. When the falling surface 43 and the rising surface 44 are in contact with each other, a relative position of the two protection plates 40 is restricted with respect to the x-axis direction (a positional restriction direction). A pair of the falling surface 43 and the rising surface 44 is called a "positional regulation shape".

A first groove 47 is formed on the lower surface 45 of the protection plate 40, and a second groove 48 is formed on the higher surface 46 thereof. The first groove 47 and the second groove 48 extend in the y-axis direction.

In each of the protection plates 40, a plurality of flow paths 50 extending in the y-axis direction are formed in an area between the first main surface 41 and the second main surface 42. Furthermore, a plurality of through holes 51 are formed so as to penetrate from the lower surface 45 of each protection plate 40 to the higher surface 46 thereof.

Except for the through holes 51, the cross-section of the protection plate 40 perpendicular to the y-axis have the same shape at any position. Therefore, it is possible to easily manufacture the protection plate 40 in the extrusion molding manner using metals such as aluminum. The through holes 51 are formed in the manner of drilling, after the extrusion molding process.

Figure 3:
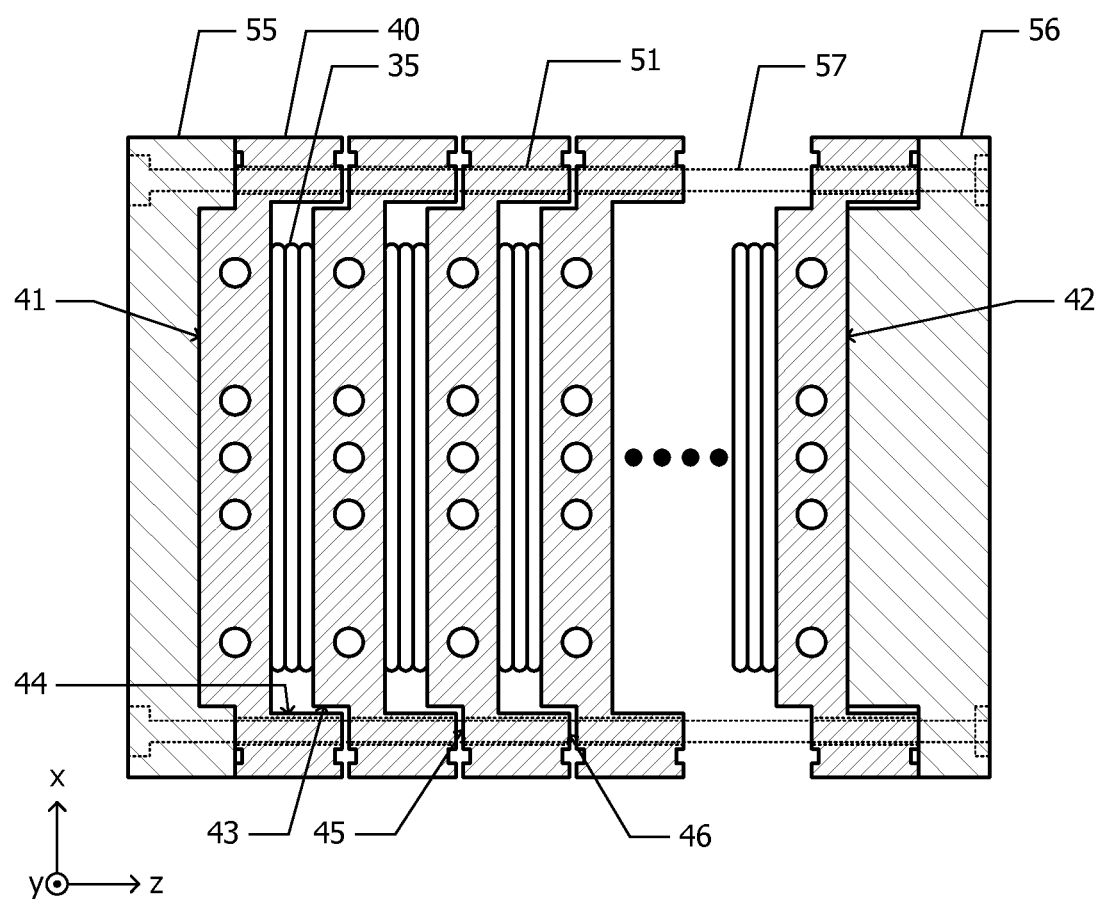
FIG. 3 is a cross-sectional view of the electricity storage module according to the example 1.

FIG. 3 shows a cross-sectional view of the electricity storage module according to the example 1. The protection plates 40 and the groups of three electricity storage cells 35 are alternately stacked up in the z-axis direction. In the two protection plates 40 adjacent to each other, the rising surface 44 of one protection plate 40 and the falling surface 43 of the other protection plate 40 are partially superimposed on each other. Therefore, both surfaces are in contact with each other or face each other interposing a small gap therebetween. In order to make it easier to understand the relative positional relationship, FIG. 3 is drawn in such a manner that a gap is set between both surfaces.

The relative position of the protection plates 40 in the x-axis direction is restricted by the rising surface 44 and the falling surface 43 (a positional restriction structure). Therefore, when stacking up the protection plates 40 and the electricity storage cells 35, it is possible to easily perform positioning thereof. Thus, it is possible to easily perform an assembly operation.

The electricity storage module includes a pressure structure which applies a compressive force in the z-axis direction to a stacked body of the protection plates 40 and the electricity storage cells 35. The electricity storage cells 35 are supported between the protection plates 40, by a compressive force applied to the stacked body. The pressure structure includes a pair of end plates 55 and 56, and a plurality of tie rods 57. The end plates 55 and 56 are disposed at both ends of the stacked body. One end plate 55 is in contact with an outer surface (the first main surface 41) of the protection plate 40 positioned at one end. The other endplate 56 is in contact with an outer surface (the second main surface 42) of the protection plate 40 positioned at the other end.

The tie rod 57 extends from one end plate 55 to the other end plate 56 while passing through the through holes 51 of the protection plates 40. It is preferable that the end plates 55 and 56 have rigidity greater than that of the protection plate 40, in order to apply a compressive force to the stacked body. For example, it is preferable that the end plates 55 and 56 be made of material having Young's modulus greater than that of the protection plate 40. Further, if the same material is used for the end plates 55 and 56 and the protection plate 40, it is preferable that the end plates 55 and 56 be designed to have rigidity greater than that of the protection plate 40, in the view point of geometrical shapes.

When acceleration is applied in the x-axis direction after assembling the electricity storage module, it is possible to obtain effects of preventing deviation of the protection plate 40 from occurring.

When a compressive force is applied to the stacked body of the protection plates 40 and the electricity storage cells 35, the electricity storage cells 35 are deformed. Thereby, an interval between the protection plates 40 is narrowed. Therefore, it is preferable that the relative position of the protection plates 40 in the z-axis direction be able to be changed freely. In the example 1, postures of the rising surface 44 and the falling surface 43 are held perpendicular to the x-axis, namely parallel to the z-axis. Therefore, it is allowed to change the interval between the protection plates 40, corresponding to a compressive force.

Either one of constant pressure preload or fixed position preload may be adopted as a method to apply a compressive force to the stacked body of the protection plates 40 and the electricity storage cells 35. In the case of applying the constant pressure preload, a compressive force having a constant magnitude is applied to the stacked body by controlling tightening torque. In the case of applying the fixed position preload, a compression amount of the stacked body is controlled. In the example 1, a compressive force is applied by a pressure mechanism until the lower surface 45 and the higher surface 46 which face each other are in contact with each other. Thereby, it is possible to control a compression amount. In this case, it is not necessary to control a tightening torque.

When an electric double layer capacitor is used to the electricity storage cell 20, a compressive force by the pressure mechanism mechanically supports the electricity storage cells 20 and prevents deterioration of electrical properties of the electricity storage cells 20. When a lithium ion capacitor or the like is used to the electricity storage cell 20, a compressive force to maintain the electrical properties is not necessarily required. Therefore, only a compressive force to mechanically support the electricity storage cells 20 is required.

Figure 4:
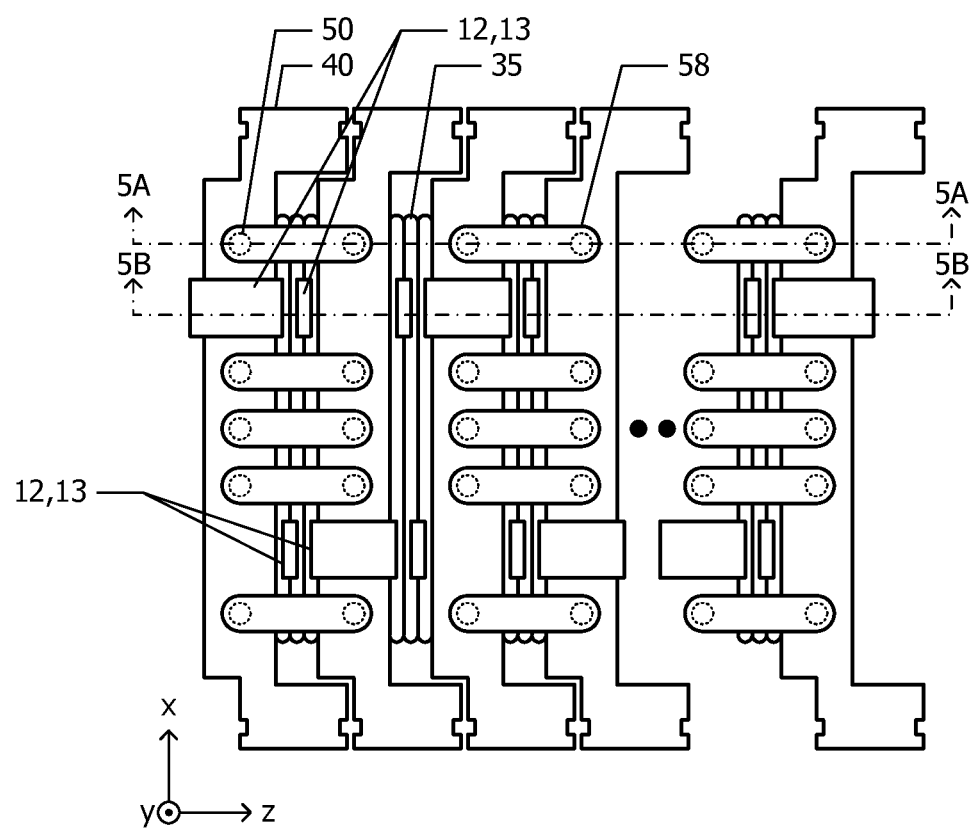
FIG. 4 is a plan view of a part of the electricity storage module according to the example 1.
Figure 5A:
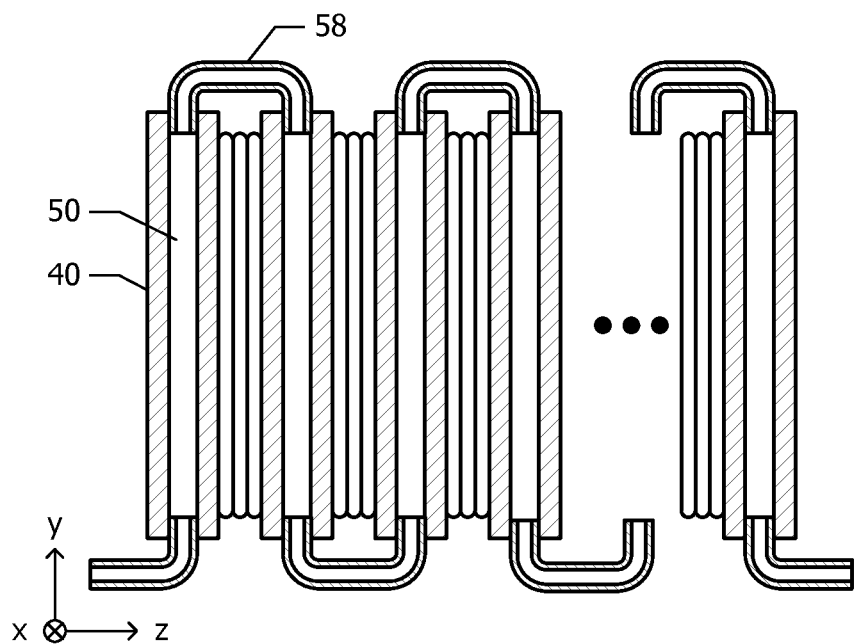
FIGS. 5A and 5B are cross-sectional views of a part of the electricity storage module according to the example 1.
Figure 5B:
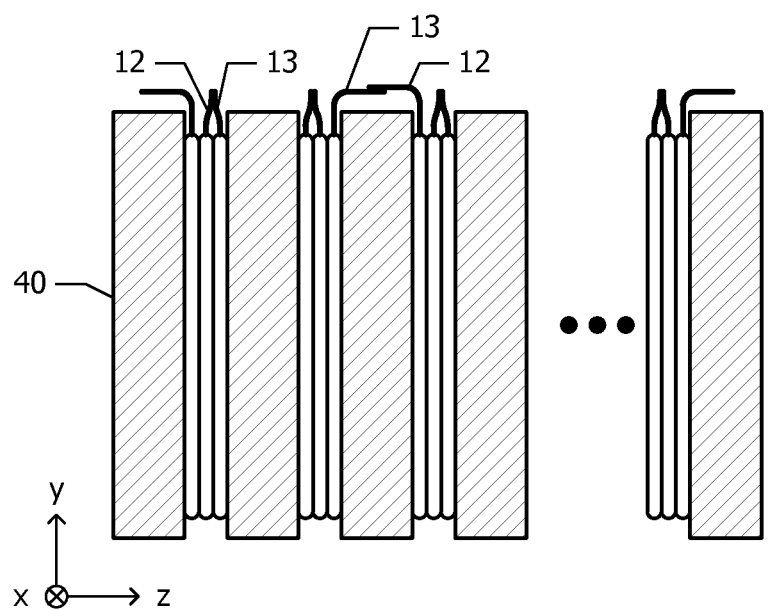

FIG. 4 shows a partial plan view of the electricity storage module according to the example 1. FIG. 5A shows a cross-sectional view of the electricity storage module taken along a dashed-dotted line 5A-5A in FIG. 4, and FIG. 5B shows a cross-sectional view of the electricity storage module taken along a dashed-dotted line 5B-5B in FIG. 4. The protection plates 40 and the electricity storage cells 35 are stacked up in the z-axis direction.

As shown in FIGS. 4 and 5A, the flow paths 50 of the protection plates 40 adjacent to each other are connected to each other by piping 58. For example, the piping 58 and the flow paths 50 are connected to each other by forming screw grooves on outside surfaces of both ends of the piping 58 and inside surfaces of both ends of the flow path 50. FIG. 5A shows an example in which the flow paths 50 of the plurality of protection plates 40 are connected to each other in series. However, the flow paths 50 are connected to each other in parallel.

As shown in FIGS. 4 and 5B, the collecting electrode tabs 12 and 13 of the two electricity storage cells 35 adjacent to each other are connected to each other, and the plurality of electricity storage cells 35 are electrically connected to each other in series. The collecting electrode tabs 12 and 13 of the two electricity storage cells 35 which are adjacent to each other via the protection plate 40 are connected to each other in a space outside (an upper side in FIG. 5B) the protection plate 40.

As shown in FIG. 4, the first collecting electrode tab 12 and the second collecting electrode tab 13 are provided at a position not overlapping with the flow paths 50, with respect to the x-axis direction. Therefore, it is possible to dispose the piping 58 so as not to overlap with the first collecting electrode tab 12 and the second collecting electrode tab 13.

Figure 6A:
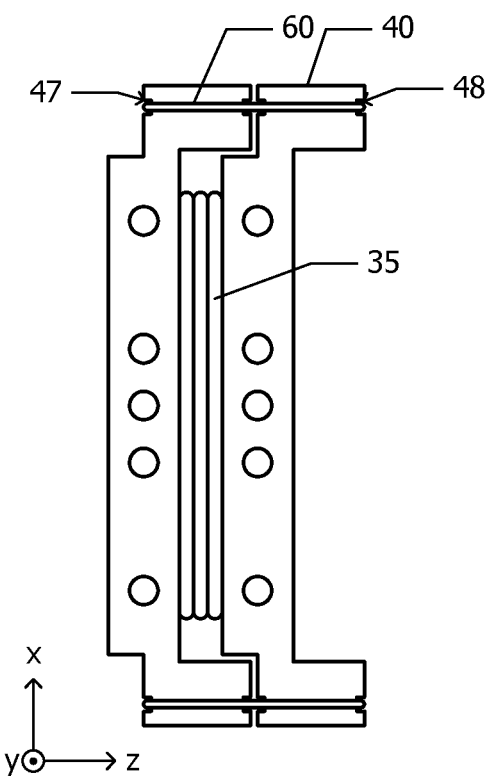
FIGS. 6A and 6B are respectively a plan view and a front view showing a state in which the electricity storage cell and a protection plate of the example 1 are temporarily fixed to each other.
Figure 6B:
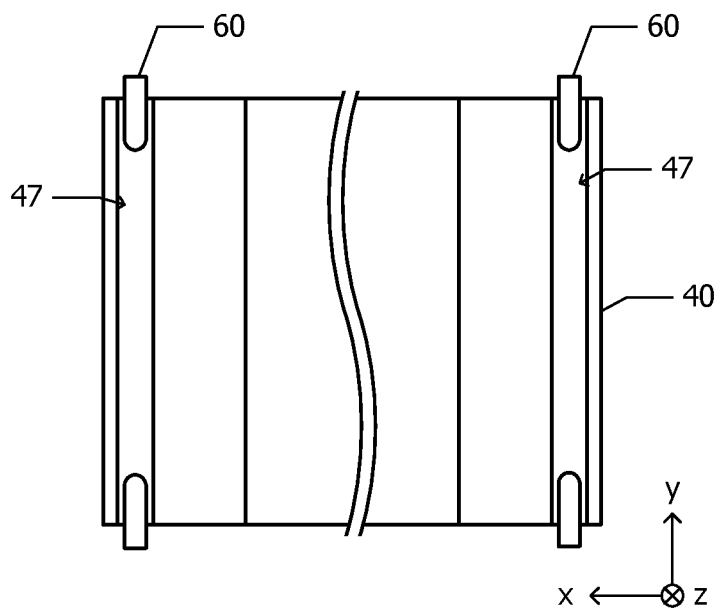

FIGS. 6A and 6B respectively show a plan view and a front view of a unit when temporarily storing the electricity storage cells 35 and the protection plates 40. A unit is constituted by the pair of protection plates 40 and one or plural pieces of electricity storage cells 35 which are interposed between the protection plates 40. Both ends of a clamp 60 are respectively fit into the first groove 47 formed on an outside surface of one protection plate 40 and the second groove 48 formed on an outside surface of the other protection plate 40, and thereby the relative position of the pair of protection plates 40 is temporarily fixed.

Since the electricity storage container 10 (see FIG. 1) of the electricity storage cell 35 is formed of a laminate film, the electricity storage container 10 is likely to be damaged by dust or the like. As shown in FIGS. 6A and 6B, the electricity storage cells 35 are stored in a state of being interposed between the protection plates 40, so it is possible to prevent the damage of the electricity storage cell 35. Furthermore, the rigidity of the electricity storage cell 35 is relatively lower than that of the protection plate 40. By interposing the electricity storage cells 35 between the protection plates 40, the rigidity thereof is increased. Thus, when handling the unit to store it temporarily, it is performed more easily than handling the electricity storage cell 35 itself. Therefore, it is possible to improve work efficiency.

Figure 7:
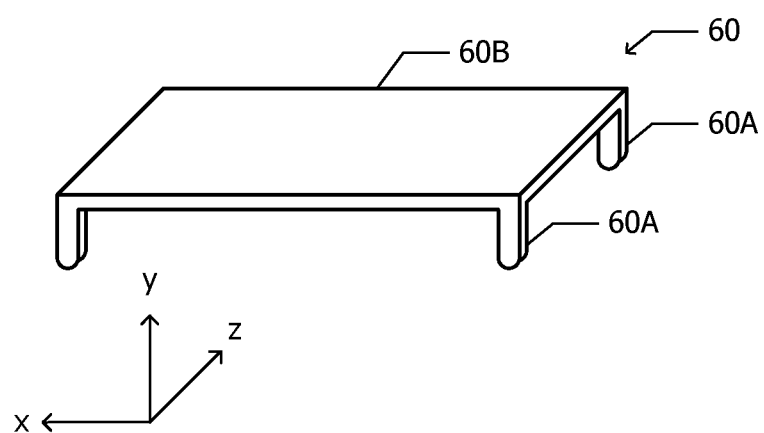
FIG. 7 is a perspective view showing another example of a clamp which is used to temporarily fix the electricity storage cell and the protection plate of the example 1 to each other.

FIG. 7 shows a modification example of the clamp 60. Protruding portions 60A which fit into the first grooves 47 and the second grooves 48 (FIGS. 6A and 6B) are formed at four corners of a plate-shaped part 60B having a rectangular shape. When the clamp 60 is fit into the pair of protection plates 40, the plate-shaped part 60B covers the space between the pair of protection plates 40 in which the electricity storage cell 35 is interposed. Therefore, it is difficult for a foreign substance such as dust to be inserted into the space accommodating the electricity storage cell 35.

EXAMPLE 2

Figure 8A:
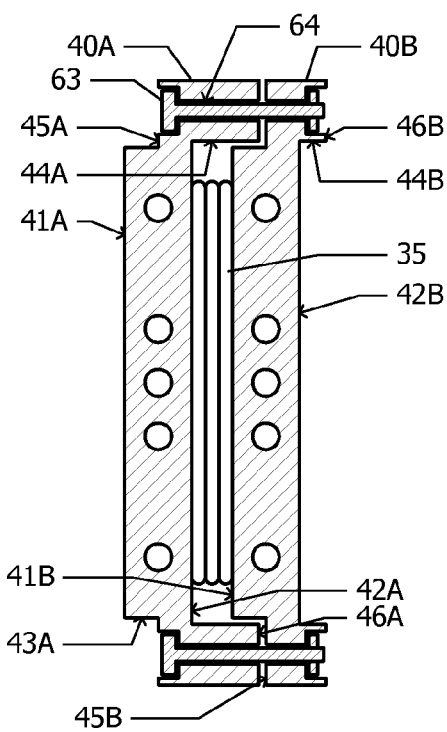
FIG. 8A is a cross-sectional view of a unit when storing an electricity storage cell and a protection plate according to an example 2.

FIG. 8A shows a cross-sectional view of a unit which is used to an electricity storage module according to an example 2. The following description focuses on the differences between the unit of the example 2 and the unit of the example 1 shown in FIG. 6A, and the description of the same configuration will be omitted.

In the example 1, the protection plates 40 are temporarily fixed to each other by the clamp 60. However, in the example 2, the protection plates 40A and 40B are fixed to each other by a fastener 63 which is constituted by a bolt and a nut. A second main surface 42A of one protection plate 40A and a first main surface 41B of the other protection plate 40B face each other.

A through hole 64 which extends from a lower surface 45A to a higher surface 46A is formed on one protection plate 40A. The through hole 64 which extends from a lower surface 45B to a higher surface 46B is formed on the other protection plate 40B. A bolt of the fastener 63 passes through the through hole 64 of one protection plate 40A and the through hole 64 of the other protection plate 40B. A concave portion for accommodating a head portion of the bolt and the nut is formed on an opening portion of the through hole 64. Therefore, the fastener 63 does not protrude from the lower surface 45A of one protection plate 40A and the higher surface 46B of the other protection plate 40B.

In the example 1, the geometrical shapes of the all protection plates 40 are the same. In the example 2, a height of a rising surface 44B of the protection plate 40B is lower than that of a rising surface 44A of the protection plate 40A. Further, the height of the rising surface 44B is almost equal to or lower than a height of a falling surface 43A of the protection plate 40A. Therefore, when one unit is superimposed on the other unit, the second main surface 42B of one unit is in contact with the first main surface 41A of the other unit.

It is possible to manufacture one protection plate 40A and the other protection plate 40B of the example 2 in the manner of extrusion molding using nozzles having different shapes.

Figure 8B:
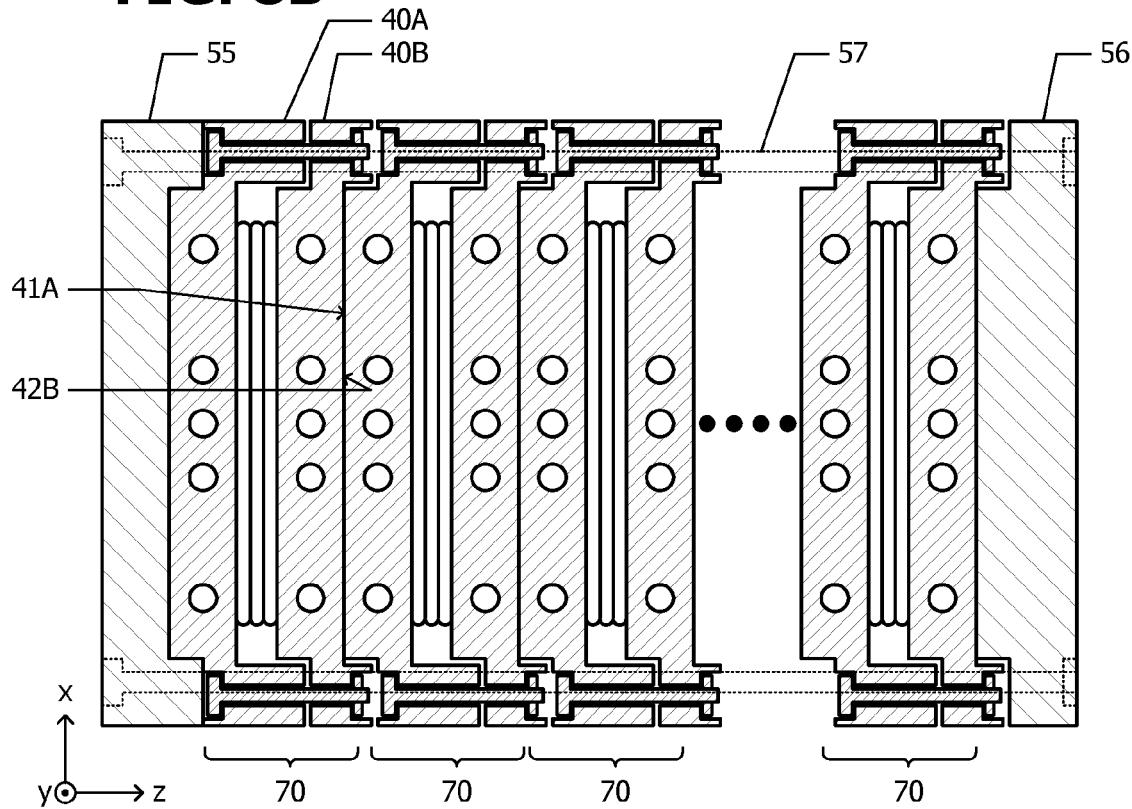
FIG. 8B is a cross-sectional view of an electricity storage module according to the example 2.

FIG. 8B shows a cross-sectional view of the electricity storage module according to the example 2. The following description focuses on the differences between the electricity storage module of the example 2 and the electricity storage module of the example 1 shown in FIG. 3, and the description of the same configuration will be omitted.

In the example 2, units 70 shown in FIG. 8A are stacked up in the z-axis direction. A first main surface 41A of the protection plate 40A of one unit 70 of two units 70 adjacent to each other is in contact with the second main surface 42B of the protection plate 40B of the other unit 70. A relative position between the protection plates 40A and 40B of each unit 70 is still fixed by the fastener 63, even in the state where a compressive force is applied thereto by the end plates 55 and 56 and the tie rods 57.

In the example 2, it is possible to temporarily store the unit 70 as it stands. Therefore, it is possible to assemble the units 70 into the electricity storage module by stacking up the units 70. Thus, ease of an assembly work is improved, compared to the example 1. In addition, it is easy to disassemble or reassemble the electricity storage module. Therefore, when one or some of electricity storage cells 35 malfunctions, it is possible to easily replace the unit 70 including the malfunctioned electricity storage cell 35 with a new one.

Figure 8C:
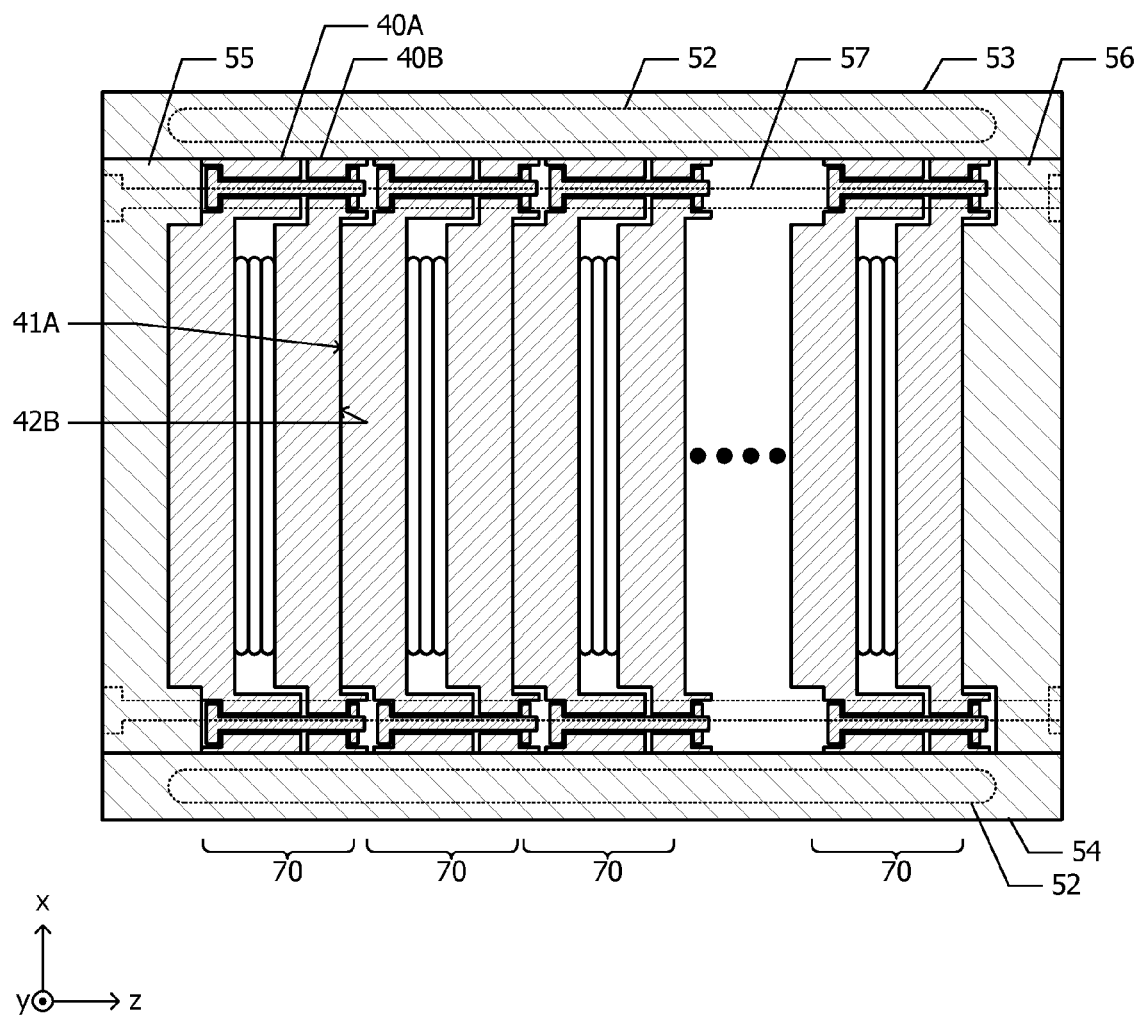
FIG. 8C is a cross-sectional view of the electricity storage module according to a modification example of the example 2.

FIG. 8C shows a cross-sectional view of the electricity storage module according to a modification example of the example 2. In the modification example, flow paths for cooling media are not formed in the protection plates 40A and 40B. Side plates 53 and 54 are disposed on sides of the stacked body of the unit 70. The flow paths 52 for cooling media are respectively formed in the side plates 53 and 54. The side plates 53 and 54 are fixed to the end plates 55 and 56 by the bolt or the like.

The side plates 53 and 54 are in contact with side surfaces of the protection plates 40A and 40B. The protection plates 40A and 40B function as a heat exchanger plate. Therefore, heat generated in the electricity storage cells 35 is transmitted to the side plates 53 and 54 via the protection plates 40A and 40B. Since the positions of the side surfaces of the protection plates 40A and 40B are aligned, each of the protection plates 40A and 40B may be stably in contact with the side plates 53 and 54. It is possible to ensure favorable heat transfer efficiency.

EXAMPLE 3

Figure 9:
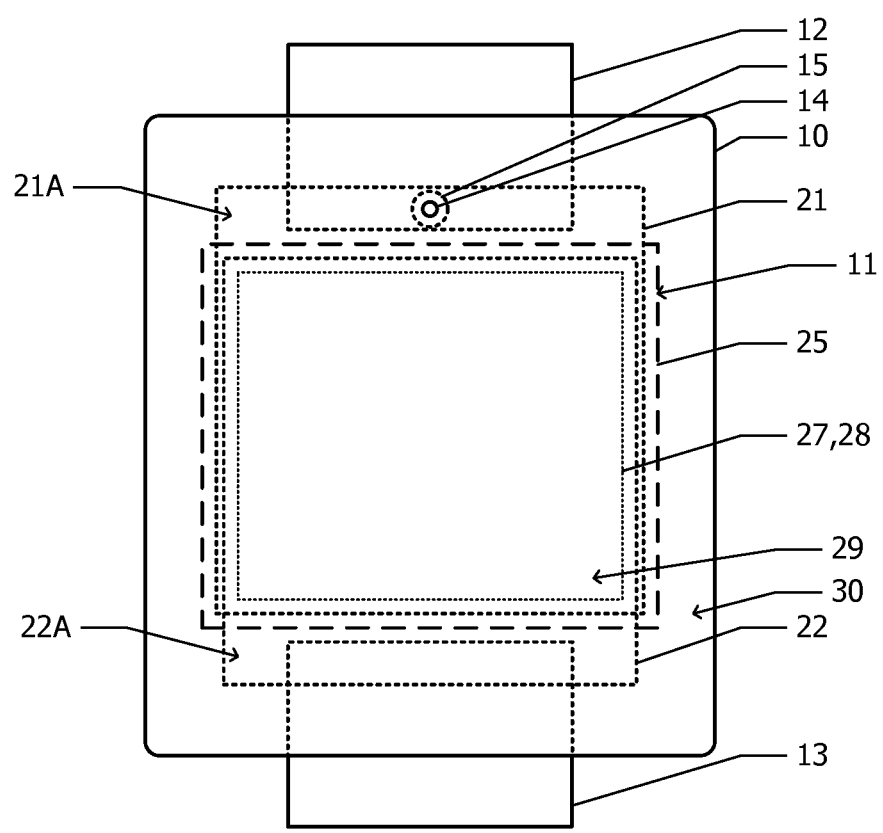
FIG. 9 is a plan view of the electricity storage cell used to an electricity storage module according to an example 3.

FIG. 9 shows a plan view of the electricity storage cell 35 used to an electricity storage module according to an example 3. The following description focuses on the differences between the electricity storage cell 35 of the example 3 and the electricity storage cell 35 of the example 1 shown in FIG. 1, and the description of the same configuration will be omitted.

In the electricity storage cell of the example 1, the first collecting electrode tab 12 and the second collecting electrode tab 13 are drawn out, in the same direction, from one edge of the electricity storage container 10. In the electricity storage cell 35 of the example 3, the first collecting electrode tab 12 and the second collecting electrode tab 13 are drawn out, in directions opposite to each other, from edges on sides opposite to each other.

Figure 10A:
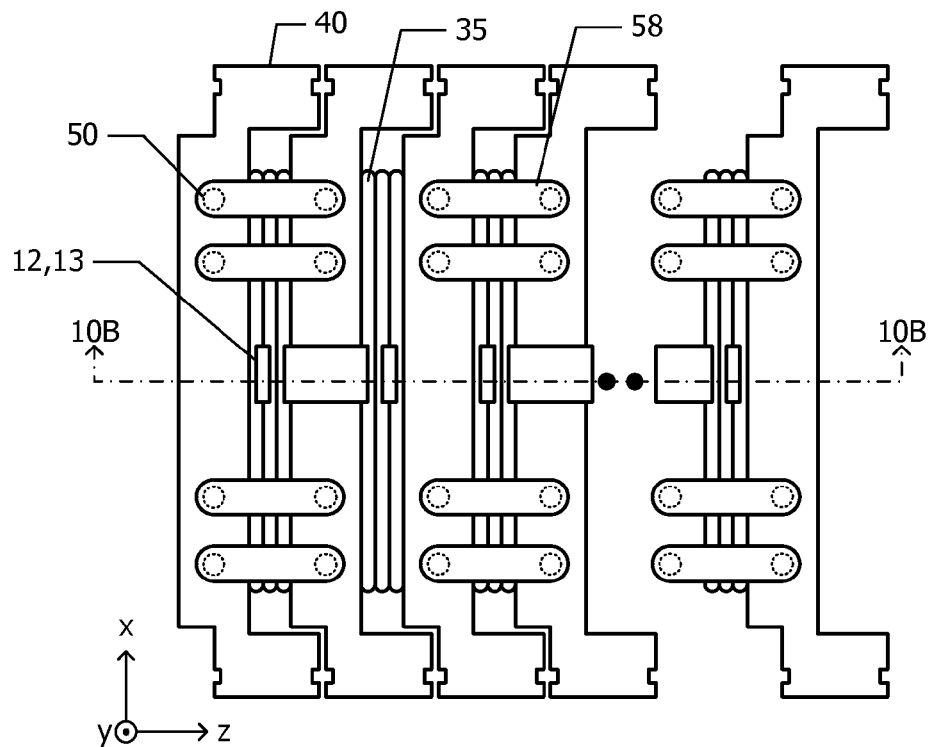
FIGS. 10A and 10B are respectively a plan view and a cross-sectional view of apart of the electricity storage module according to the example 3.
Figure 10B:
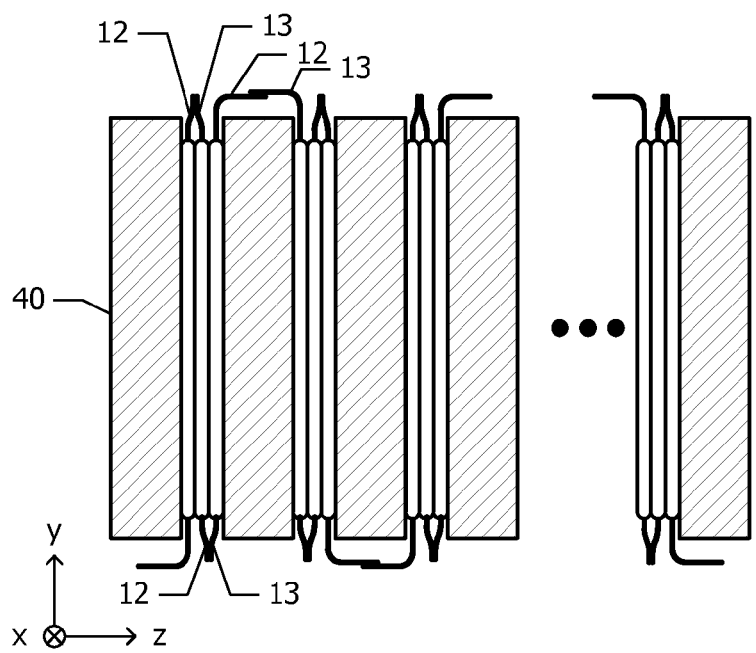

FIG. 10A shows a plan view of a part of the electricity storage module according to the example 3, and FIG. 10B shows a cross-sectional view thereof. The following description focuses on the differences between the electricity storage module of the example 3 and the electricity storage module of the example 1 shown in FIGS. 4 and 5B, and the description of the same configuration will be omitted.

In the example 1, the first collecting electrode tab 12 and the second collecting electrode tab 13 pass through only an upper space of the protection plate 40, as shown in FIG. 5B. However, the first collecting electrode tab 12 and the second collecting electrode tab 13 pass through upper and lower spaces of the protection plate 40, in the example 3. The piping 58 is disposed at a position different from that of the first collecting electrode tab 12 and the second collecting electrode tab 13, with respect to the x-axis direction.

In the example 3, it is possible to achieve the same effects as those of the example 1.

EXAMPLE 4

A working machine according to an example 4 will be described with reference to FIGS. 11 to 14. In the example 4, a hybrid shovel is exemplified as a working machine mounted with at least one of the electricity storage modules described in the examples 1 to 3.

FIG. 11 is a schematic plan view of a hybrid shovel according to the example 4. A base carrier (a travelling device) 71 is attached to an upper revolving body 70 via a revolving bearing 73. An engine 74, a main pump 75, an electric motor for revolving 76, an oil tank 77, a cooling fan 78, a seat 79, an electricity storage module 80 and a motor generator 83 are mounted in the upper revolving body 70. The engine 74 generates motive power by burning fuel. The engine 74, a main pump 75 and a motor generator 83 send or receive torque to or from one another, via a torque transmission mechanism 81. The main pump 75 supplies a pressure oil to a hydraulic cylinder of a boom 82 or the like.

The motor generator 83 is driven by receiving motive power from the engine 74 and generates electric power (an electric power generation operation). The generated electric power is supplied to the electricity storage module 80, whereby the electricity storage module 80 is charged. In addition, the motor generator 83 is driven by the electric power from the electricity storage module 80 and generates motive power to assist the engine 74 (the assist operation). The oil tank 77 stores oil for a hydraulic circuit. The cooling fan 78 regulates the increase of oil temperature of the hydraulic circuit. An operator seats himself on the seat 79 and operates the hybrid shovel.

Figure 12:
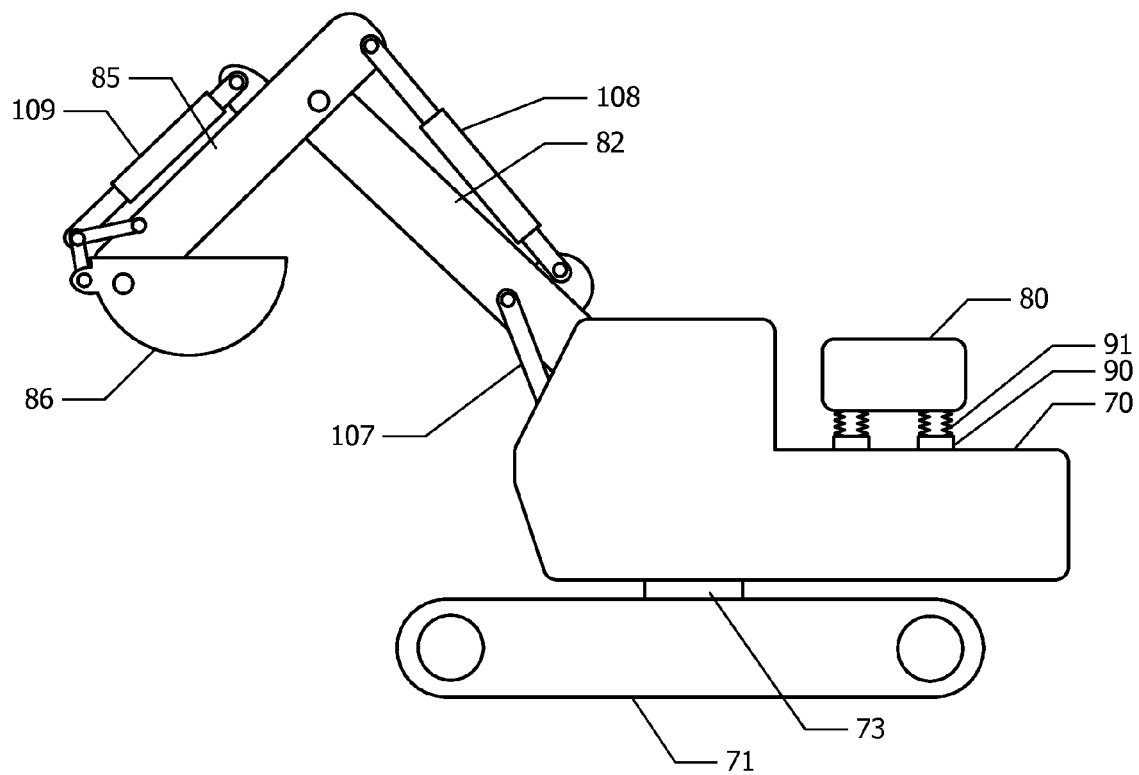
FIG. 12 is a schematic side view of the hybrid shovel according to the example 4.

FIG. 12 shows a side view of the hybrid shovel according to the example 4. The upper revolving body 70 is mounted on the base carrier 71 via the revolving bearing 73. The electric motor for revolving 76 (see FIG. 11) rotates the upper revolving body 70, as a drive target, in a clockwise or counter-clockwise direction with respect to the base carrier 71. The boom 82 is attached to the upper revolving body 70. The boom 82 oscillates in an upward or downward direction with respect to the upper revolving body 70, by a boom cylinder 107 driven hydraulically. An arm 85 is attached to a tip of the boom 82. The arm 85 oscillates in a front or rear direction with respect to the boom 82, by an arm cylinder 108 driven hydraulically. A bucket 86 is attached to a tip of the arm 85. The bucket 86 oscillates in an upward or downward direction with respect to the arm 85, by a bucket cylinder 109 driven hydraulically.

The electricity storage module 80 is mounted on the upper revolving body 70 via a mount 90 for electricity storage module and a damper (a vibration isolation device) 91. The electricity storage modules according to the examples 1 to 3 described above are used as the electricity storage module 80. The electric motor for revolving 76 (see FIG. 11) is driven by the electric power supplied from the electricity storage module 80. In addition, the electric motor for revolving 76 generates regenerative electric power by converting kinetic energy into electrical energy. The electricity storage module 80 is charged by the generated regenerative electric power.

Figure 13:
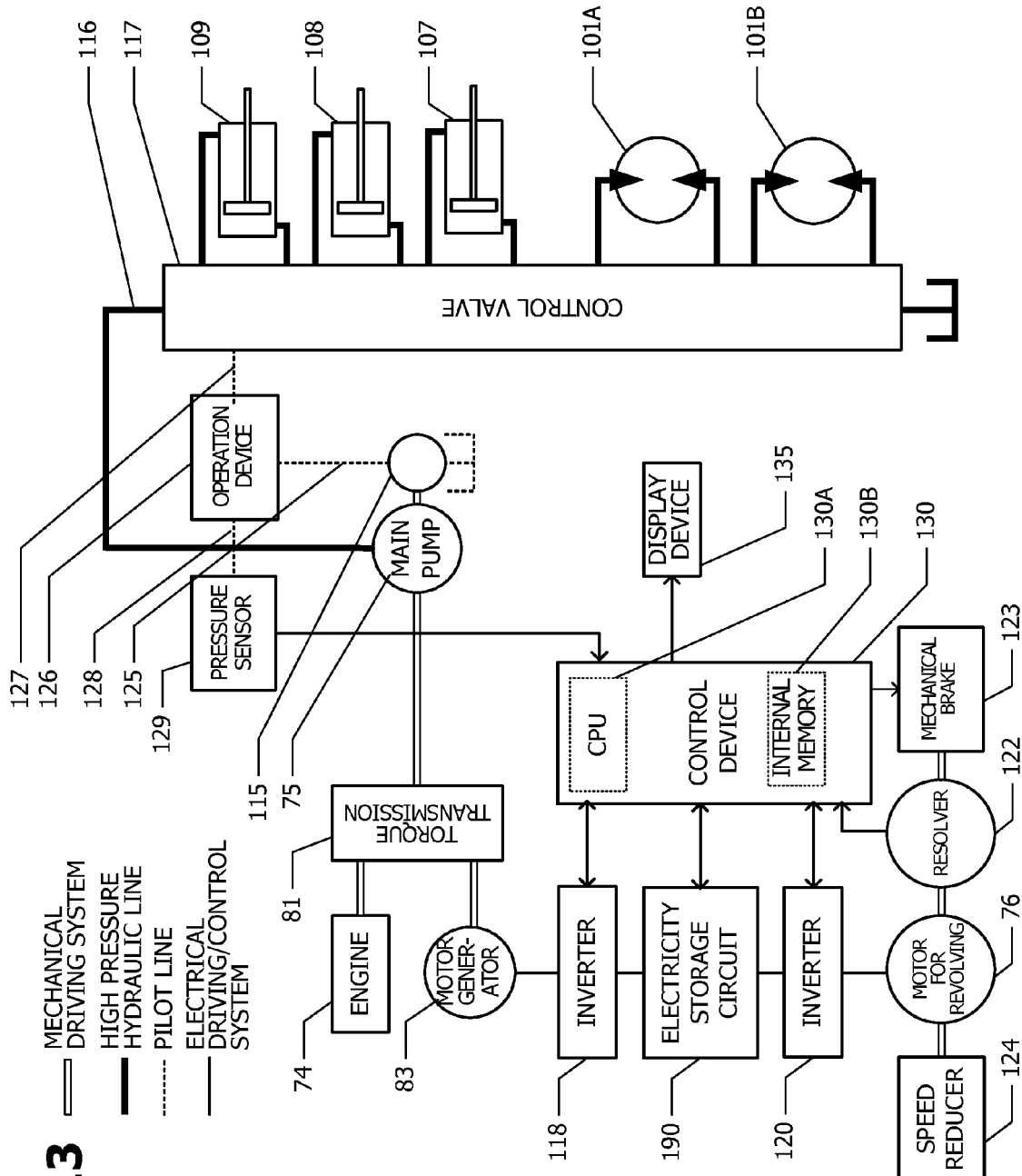
FIG. 13 is a block diagram of the hybrid shovel according to the example 4.

FIG. 13 shows a block diagram of the hybrid shovel according to the example 4. In FIG. 13, a mechanical power system is represented by a double line, the high pressure hydraulic line is represented by a thick solid line, and the pilot line is represented by a dashed line.

A driving shaft of the engine 74 is connected to an input shaft of the torque transmission mechanism 81. An engine which generates a driving force by fuel except for electricity, such as an internal combustion engine, for example, a diesel engine is used as the engine 74. The engine 74 is always driven during the operation of the working machine.

A driving shaft of the motor generator 83 is connected to the other input shaft of the torque transmission mechanism 81. The motor generator 83 can perform both operation movements of an electromotive (assist) operation and the electric power generation operation. An interior permanent magnet (IPM) motor in which a magnet is embedded in a rotor is used as the motor generator 83, for example.

The torque transmission mechanism 81 has two input shafts and an output shaft. The output shaft is connected to a driving shaft of the main pump 75.

When the load applied to the engine 74 is great, the motor generator 83 carries out the assist operation. Thereby, the driving force of the motor generator 83 is transmitted to the main pump 75 via the torque transmission mechanism 81. Therefore, the load applied to the engine 74 is reduced. On the other hand, when the load applied to the engine 74 is small, the driving force of the engine 74 is transmitted to the motor generator 83 via the torque transmission mechanism 81. Thereby, the motor generator 83 carries out the electric power generation operation. Switching between the assist operation and the electric power generation operation of the motor generator 83 is performed by an inverter 118 connected to the motor generator 83. The inverter 118 is controlled by a control device 130.

The control device 130 includes a central processing unit (CPU) 130A and an internal memory 130B. The CPU 130A executes a drive control program stored in the internal memory 130B. The control device 130 draws a driver's attention by displaying deterioration states of various devices on a display device 135.

The main pump 75 supplies hydraulic pressure to a control valve 117 via a high pressure hydraulic line 116. By receiving a command from a driver, the control valve 117 distributes the hydraulic pressure to hydraulic motors 101A and 101B, the boom cylinder 107, the arm cylinder 108 and the bucket cylinder 109. The hydraulic motors 101A and 101B respectively drive two left and right crawlers provided in the base carrier 71 shown in FIGS. 11 and 12.

Input and output terminals of an electric system in the motor generator 83 are connected to electricity storage circuit 190 via the inverter 118. Based on a command from the control device 130, the inverter 118 performs an operation control of the motor generator 83. Further, the electric motor for revolving 76 is connected to the electricity storage circuit 190 via another inverter 120. The electricity storage circuit 190 and the inverter 120 are controlled by the control device 130.

During the period in which the motor generator 83 is brought into the assist operation, a required electric power is supplied from the electricity storage circuit 190 to the motor generator 83. During the period in which the motor generator 83 is brought into the electric power generation operation, an electric power generated by the motor generator 83 is supplied to the electricity storage circuit 190.

The electric motor for revolving 76 is AC-driven by pulse width modulation (PWM) control signals from the inverter 120. Thereby, it is possible for the electric motor for revolving 76 to perform both operations of driving operation and regenerative operation. An IPM motor is used as the electric motor for revolving 76, for example. During the regeneration, an IPM motor generates a great induced electromotive force.

During the driving operation of the electric motor for revolving 76, the electric motor for revolving 76 revolves the upper revolving body 70 via a speed reducer 124. At this time, the speed reducer 124 causes the rotational speed to be reduced. Thereby, the torque generated by the electric motor for revolving 76 is increased. Furthermore, during a regenerative operation, a rotational motion of the upper revolving body 70 is transmitted to the electric motor for revolving 76 via the speed reducer 124. Thereby, the electric motor for revolving 76 generates the regenerative electric power. At this time, the speed reducer 124 causes the rotational speed to be increased, on the contrary to the case of the driving operation. Thereby, it is possible to increase the revolution speed of the electric motor for revolving 76.

A resolver 122 detects a rotation-directional position of a rotation shaft of the electric motor for revolving 76. The detection result is input to the control device 130. A revolving angle and a revolving direction are derived by detecting the rotation-directional positions of the rotation shaft of the electric motor for revolving 76 before and after the operation.

A mechanical brake 123 is connected to the rotation shaft of the electric motor for revolving 76 and generates a mechanical braking force. Under control from the control device 130, a brake state and a release state of the mechanical brake 123 are switched by an electromagnetic switch.

A pilot pump 115 generates a pilot pressure required to a hydraulic pressure operation system. The generated pilot pressure is supplied to an operation device 126 via a pilot line 125. The operation device 126 includes a lever and a pedal and is operated by a driver. In response to the operation of a driver, the operation device 126 converts a primary side hydraulic pressure supplied from the pilot line 125 into a secondary side hydraulic pressure. The secondary side hydraulic pressure is transmitted to the control valve 117 via a hydraulic line 127 and transmitted to a pressure sensor 129 via another hydraulic line 128.

The detection result of pressure which is detected by the pressure sensor 129 is input to the control device 130. Thereby, it is possible for the control device 130 to detect operation states of the base carrier 71, the electric motor for revolving 76, the boom 82, the arm 85 and the bucket 86.

Figure 14:
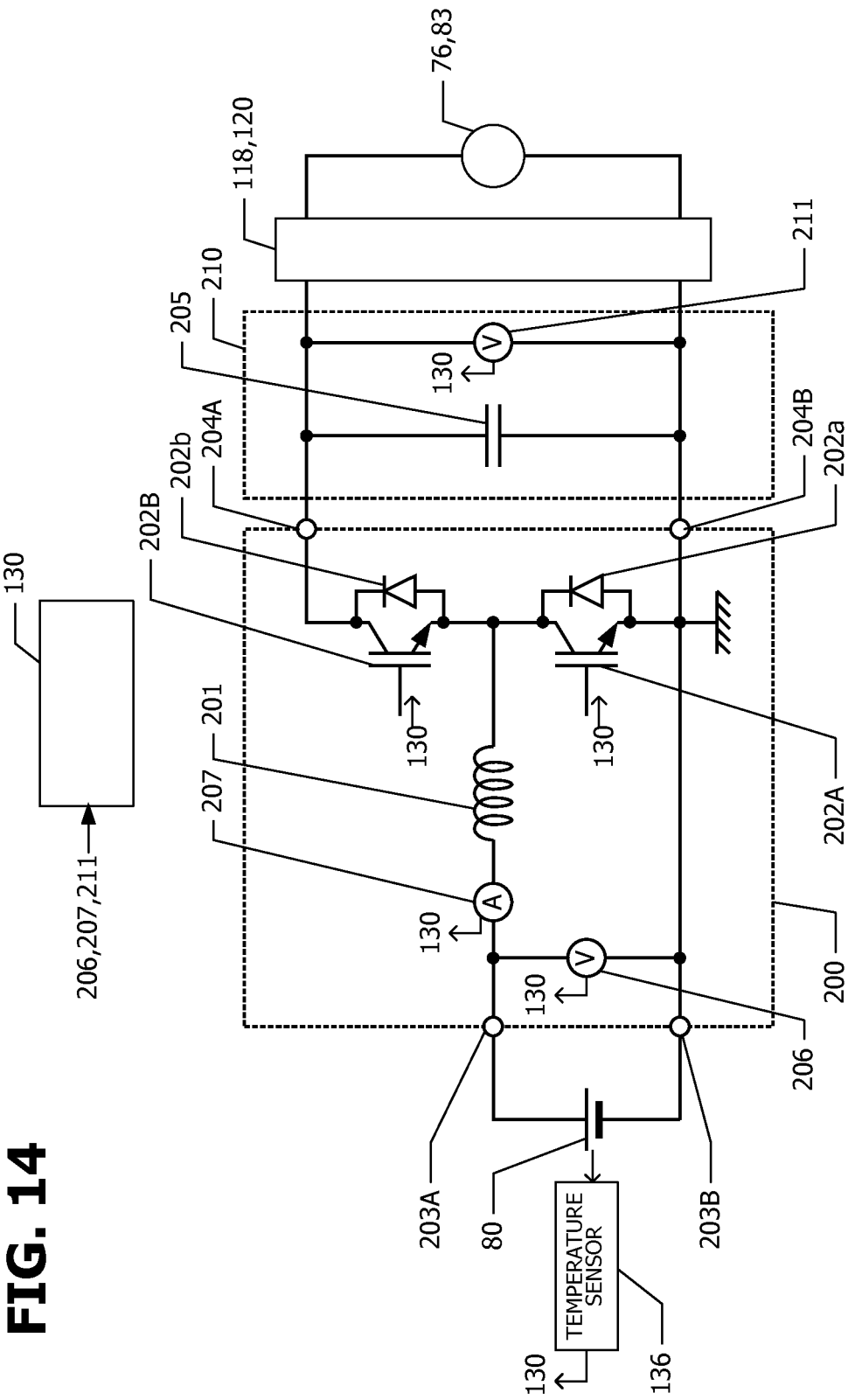
FIG. 14 is an equivalent circuit schematic of an electricity storage circuit of the hybrid shovel according to the example 4.

FIG. 14 shows an equivalent circuit schematic of the electricity storage circuit 190. The electricity storage circuit 190 includes the electricity storage module 80, a converter 200 and a DC bus line 210. The electricity storage module 80 is connected to a pair of power source connection terminals 203A and 203B of the converter 200, and the DC bus line 210 is connected to a pair of output terminals 204A and 204B. One power source connection terminal 203B and one output terminal 204B are grounded. The electricity storage modules according to the examples 1 to 3 are used as the electricity storage module 80.

The DC bus line 210 is connected to the motor generator 83 and the electric motor for revolving 76 via the inverters 118 and 120. The voltage generated in the DC bus line 210 is measured by a voltmeter 211, and the measurement result is input to the control device 130.

A series circuit in which a collector of a step-up insulated-gate bipolar transistor (IGBT) 202A and an emitter of a step-down IGBT 202B is connected to each other is connected between the output terminals 204A and 204B. An emitter of the step-up IGBT 202A is grounded, and a collector of the step-down IGBT 202B is connected to the high-voltage side output terminal 204A. A connection point between the step-up IGBT 202A and the step-down IGBT 202B is connected to the high-voltage side power source connection terminal 203A, via a reactor 201.

In a state where a direction from the emitter toward the collector is a forward direction, diodes 202$a$ and 202$b$ are respectively connected to the step-up IGBT 202A and the step-down IGBT 202B in parallel. A smoothing capacitor 205 is inserted between the output terminals 204A and 204B.

A voltmeter 206 connected across the power source connection terminals 203A and 203B measures the voltage across terminals of the electricity storage module 80. An ammeter 207 which is connected to the reactor 201 in series measures the charging or discharging current of the electricity storage module 80. The measurement results of voltage and current are input to the control device 130.

A temperature sensor 136 detects a temperature of the electricity storage module 80. The detected temperature data are input to the control device 130. The temperature sensor 136 includes four thermometers corresponding to four electricity storage cells which are selected among the plurality of electricity storage cells constituting the electricity storage module 80, for example. The control device 130 calculates the average of four temperature data obtained from the four thermometers, for example. The average value is adopted as the temperature of the electricity storage module 80. Instead, when determining the overheating state of the capacitor, the highest temperature among the temperatures which are indicated by the four temperature data may be adopted as the temperature of the electricity storage module. On the contrary, when determining the overcooling state of the electricity storage module, the lowest temperature among the temperatures which are indicated by the four temperature data may be adopted as the temperature of the electricity storage module.

The control device 130 applies a pulse width modulation (PWM) voltage for controlling to gate electrodes of the step-up IGBT 202A and the step-down IGBT 202B.

Hereinafter, a step-up operation (a discharging operation) will be described. The PWM voltage is applied to the gate electrode of the step-up IGBT 202A. When the step-up IGBT 202A is turned to an off state, an induced electromotive force is generated in the reactor 201 in a direction where the current is caused to flow from the high-voltage side power source connection terminal 203A toward the collector of the step-up IGBT 202A. The electromotive force is applied to the DC bus line 210 via the diode 202$b$. Thereby, the voltage of the DC bus line 210 is increased.

Subsequently, a step-down operation (a charging operation) will be described. The PWM voltage is applied to the gate electrode of the step-down IGBT 202B. When the step-down IGBT 202B is turned to an off state, an induced electromotive force is generated in the reactor 201 in a direction where the current is caused to flow from the emitter of the step-down IGBT 202B toward the high-voltage side power source connection terminal 203A. The electricity storage module 80 is charged by the induced electromotive force.

Since the electricity storage modules according to the examples 1 to 3 described above are used as the electricity storage module 80, deviation of the electricity storage cells 35 and the protection plates 40 in the electricity storage module 80, which is caused by impact or vibration, is suppressed. Especially, when the upper revolving body 70 is vibrated upward and downward due to chattering of the revolving bearing 73 (see FIGS. 11 and 12), it is possible to suppress the deviation due to the vibration not completely absorbed by the damper 91 (see FIG. 12). Furthermore, since cooling media such as water is circulated through the flow path 50, it is possible to achieve efficient heat dissipation of the electricity storage cell.

EXAMPLE 5

In an example 5, an electric shovel is exemplified as an example of a working machine mounted with at least one of the electricity storage modules according to the examples 1 to 3.

Figure 15:
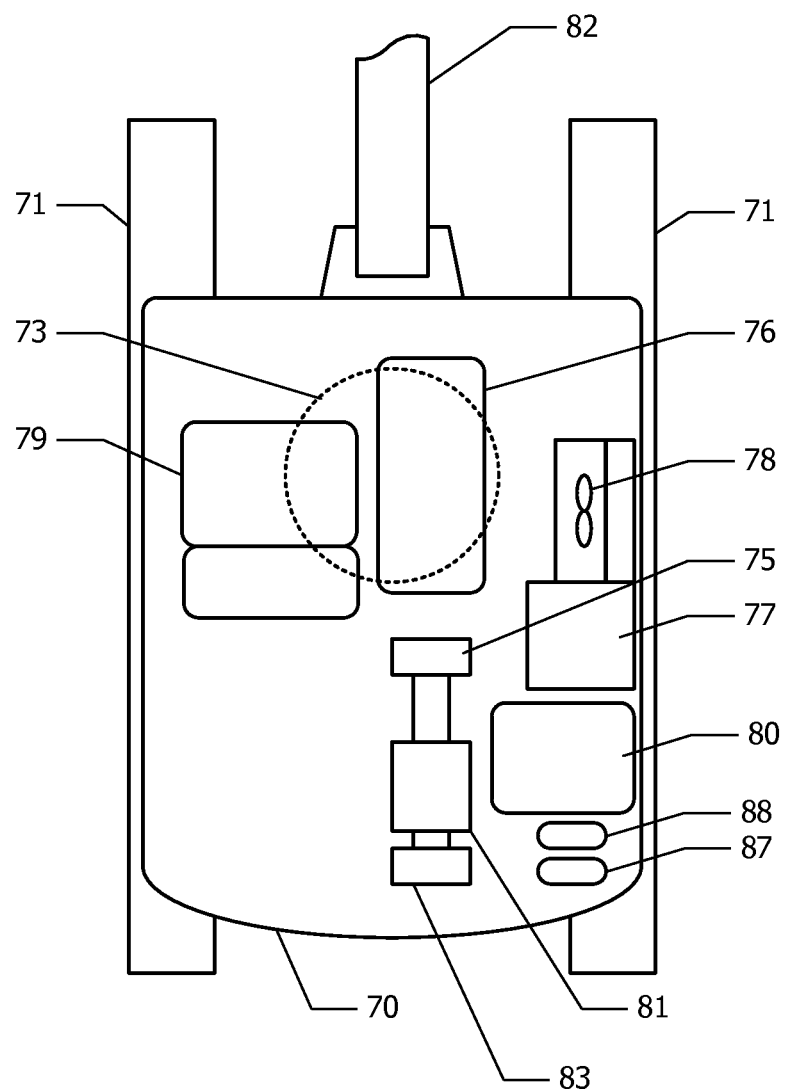
FIG. 15 is a schematic plan view of an electric shovel according to an example 5.
Figure 16:
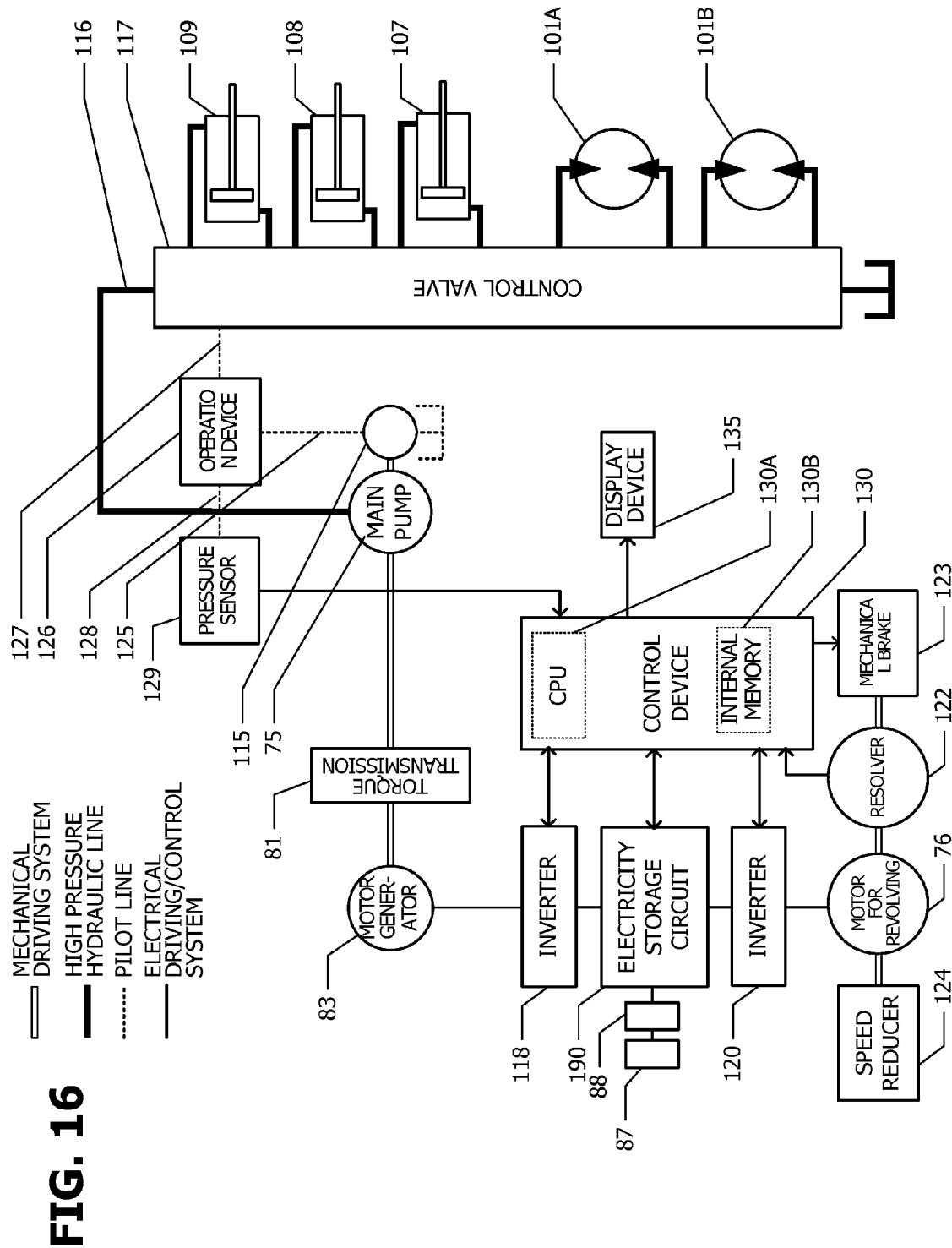
FIG. 16 is a block diagram of the electric shovel according to the example 5.

FIG. 15 is a schematic plan view of the electric shovel according to the example 5, and FIG. 16 is a block diagram thereof. The following description focuses on the differences between the example 5 and the example 4 shown in FIGS. 11 and 13, and the description of the same configuration will be omitted.

The engine 74 (see FIGS. 11 and 13) is not mounted in the electric shovel according to the example 5. A voltage converter 88 and the external power source connection plug 87 are prepared for charging the electricity storage module 80. The electricity storage module 80 can be charged by an external power source via an external power source connection plug 87 and a voltage converter 88. The motor generator 83 does not function as a power generator and only functions as an electric motor by receiving the electric power supplied from the electricity storage module (the electricity storage circuit 190).

The voltage converter 88 performs a voltage conversion for adapting the voltage of the external power source to the voltage of the electricity storage module 80.

The electricity storage modules according to the examples 1 to 3 can be adopted not only to the hybrid shovel of the example 4 but also to the electric shovel of the example 5.

As an application example with respect to a working machine, a hybrid shovel and an electric shovel are exemplified in the examples 4 and 5. However, aside from the shovel, the electricity storage modules according to the examples 1 to 3 can be applied to other working machines such as a wheel loader, a bulldozer or a forklift. When the electricity storage modules according to the examples 1 to 3 are applied to a wheel loader or a forklift, an electric power is supplied from the electricity storage module to an electric motor for travelling. The electric motor for travelling drives a travelling device, as a drive target, such as a wheel. The travelling device is driven by the electric motor for travelling. Thereby, the travelling device moves a main body portion mounted thereon forward and backward.

Although the present invention is described with reference to the examples, the present invention is not limited thereto. For example, it is apparent to a person skilled in the art that various modifications, improvements, combinations or the like can be performed on the present invention.

Based on the examples described above, the present invention shown in following appendices will be disclosed.

(Appendix 1)

An electricity storage module has a plurality of protection plates which are stacked up in a stacked direction and a plate-shaped electricity storage cell which is interposed between the protection plates adjacent to each other. The protection plate has a positional restriction shape for restricting a relative position in a positional restriction direction which is perpendicular to the stacked direction.

(Appendix 2)

In the electricity storage module according to Appendix 1, the positional restriction shape is configured by a stepped surface perpendicular to the positional restriction direction, and the protection plates are configured so that the stepped surfaces formed on surfaces facing each other face each other, whereby the relative position of both protection plates is restricted with respect to the positional restriction direction.

(Appendix 3)

In the electricity storage module according to Appendix 2, the protection plate includes flow paths which are formed inside the protection plate and extend in directions perpendicular to the stacking direction and the positional restriction direction.

(Appendix 4)

The electricity storage module according to Appendix 2 additionally has a side plate which is disposed on a side of a stacked body of the protection plates and is thermally coupled to the protection plates, and a flow path for cooling media which is provided on or inside the side plate.

(Appendix 5)

In the electricity storage module according to anyone of appendices 2 to 4, grooves for temporarily fixing a relative position are formed on one surface and the other surface of the protection plate so as to extend in the directions perpendicular to the stacked direction and the positional restriction direction.

(Appendix 6)

In the electricity storage module according to anyone of appendices 1 to 5, a plurality of the electricity storage cells connected in series are interposed between the protection plates adjacent to each other.

(Appendix 7)

The electricity storage module according to any one of appendices 1 to 6 additionally has a pressure structure which applies a compressive force to a stacked body constituted by the electricity storage cell and the protection plates, in the stacked direction.

REFERENCE SIGNS LIST

10: electricity storage container
11: electricity storage laminated body
12: first collecting electrode tab
13: second collecting electrode tab
14: gas drainage hole
15: gas drainage structure
21: first collecting electrode
21A: extension part
22: second collecting electrode
22A: extension part
25: separator (electrolyte)
27: first polarizable electrode 28: second polarizable electrode
29: electrode area
30: frame area
35: electricity storage cell
40: protection plate
41: first main surface
42: second main surface
43: first stepped surface (falling surface)
44: second stepped surface (rising surface)
45: first sub-surface (lower surface)
46: second sub-surface (higher surface)
47: first groove
48: second groove
50: flow path
51: through hole
52: flow path
53, 54: side plate
55, 56: end plate
57: tie rod
58: piping
60: clamp
60A: plate-shaped part
60B: protruding portion
63: fastener
64: through hole
70: upper revolving body
71: base carrier (base body)
73: revolving bearing
74: engine
75: main pump
76: electric motor for revolving
77: oil tank
78: cooling fan
79: seat
80: electricity storage module
81: torque transmission mechanism
82: boom
83: motor generator
85: arm
86: bucket
87: external power source connection plug
88: voltage converter
90: electricity storage module mount
91: damper (vibration isolation device)
101A, 101B: hydraulic motor
107: boom cylinder
108: arm cylinder
109: bucket cylinder
114: main pump
115: pilot pump
116: high pressure hydraulic line
117: control valve
118: inverter
119: capacitor
120: inverter
122: resolver
123: mechanical brake
124: speed reducer
125: pilot line
126: operation device
127, 128: hydraulic line
129: pressure sensor
130: control device
135: display device
136: temperature sensor
200: converter
201: reactor
202A: step-up IGBT
202B: step-down IGBT
202$a$, 202$b$: diode
203$a$, 203$b$: power source connection terminal
204A. 204B: output terminal
205: smoothing capacitor
206: voltmeter
207: ammeter
211: voltmeter

The invention claimed is:
1. A shovel comprising:
a base carrier;
an upper revolving body which is revolvably mounted on the carrier;
an electricity storage module; and
an electric motor which revolves the upper revolving body by receiving electric power from the electricity storage module,
wherein the electricity storage module includes
a plurality of protection plates which are stacked up in a stacked direction,
plate-shaped electricity storage cells which are interposed between the protection plates adjacent to each other,
a flow path for cooling media formed on or inside the protection plates or formed on or inside a side plate which is in contact with the protection plates at a side surface thereof, and
a pressure structure which applies a compressive force to a stacked body constituted by the plate-shaped electricity storage cells and the protection plates, in the stacked direction, and
wherein the protection plates include a positional restriction shape for restricting a relative position with respect to a positional restriction direction which is perpendicular to the stacked direction,
each of the protection plates includes a first main surface that is perpendicular to the stacked direction and has a pair of first edges parallel to a first direction, a second main surface that is perpendicular to the stacked direction and has a pair of second edges parallel to the first direction, falling surfaces that are continued to the pair of first edges and are parallel to the stacked direction, and rising surfaces that are continued to the pair of second edges and are parallel to the stacked direction, and wherein
the first main surface of any one of the protection plates faces the second main surface of adjacent one of the protection plates, the plate-shaped electricity storage cells being interposed between the first main surface and the second main surface facing each other, and wherein
the falling surfaces of any one of the protection plates and the rising surfaces of adjacent one of the protection plates face each other and are in contact with each other.

* * * * *